D. V. BURRELL.
CENTRIFUGAL PUMP.
APPLICATION FILED MAY 6, 1909.
941,557.
Patented Nov. 30, 1909.
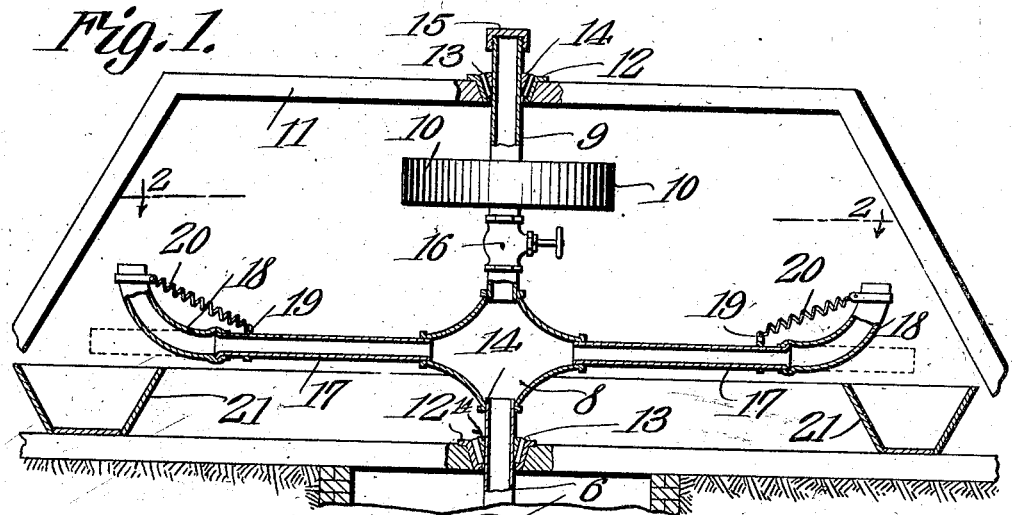
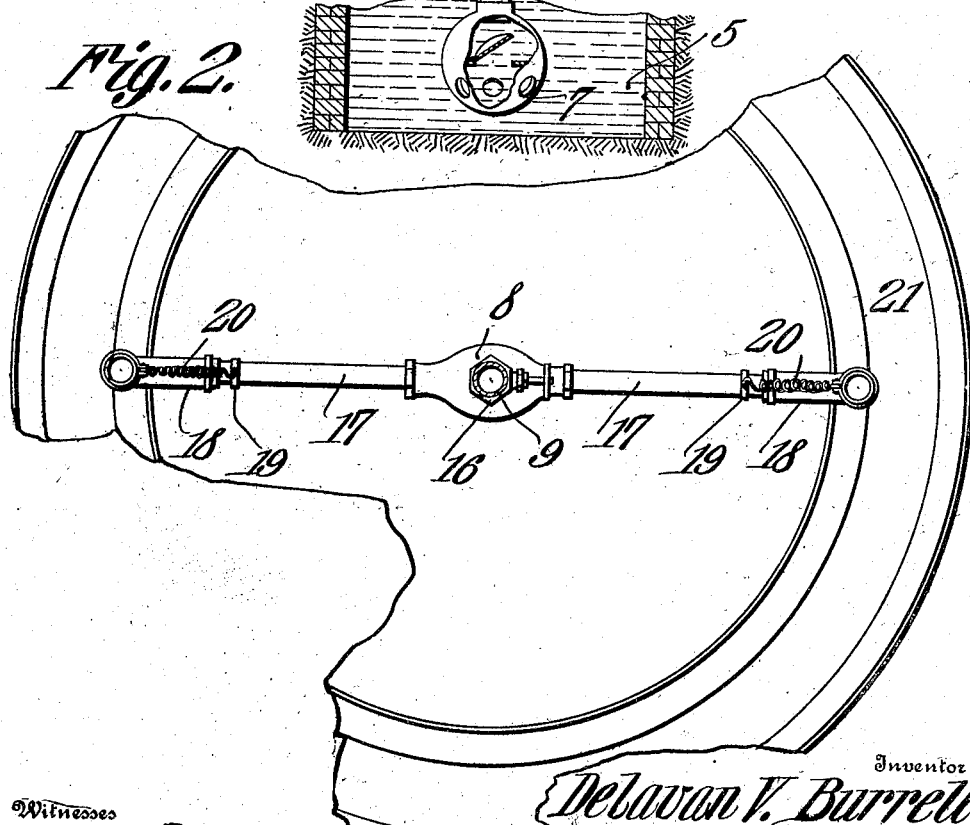
Witnesses
Inventor
Delavan V. Burrell.
By C. A. Snow & Co.
Attorneys

UNITED STATES PATENT OFFICE.

DELAVAN V. BURRELL, OF ROCKY FORD, COLORADO.

CENTRIFUGAL PUMP.

941,557.

Specification of Letters Patent.   Patented Nov. 30, 1909.

Application filed May 6, 1909.   Serial No. 494,263.

*To all whom it may concern:*

Be it known that I, DELAVAN V. BURRELL, a citizen of the United States, residing at Rocky Ford, in the county of Otero and State of Colorado, have invented a new and useful Centrifugal Pump, of which the following is a specification.

This invention relates to centrifugal pumps designed more particularly for irrigation purposes or where a large volume of water is required.

The object of the present invention is to provide a very simple pump of high efficiency which can be manufactured at a low cost, in order to enable those having a sufficient water supply for irrigation, either from underflow, streams, or other sources, to establish pumping plants on such an economical basis as would make practical the development of large areas requiring irrigation.

A further object is to so construct the pump that all its parts which conduct water shall revolve together, and that the structure shall be so supported and located with respect to the conveying channels as not to interfere with the flow.

Another object is to provide a device for holding the priming which will in no way obstruct the flow when the pump is in operation.

Another object is to provide an air-tight device for priming which is readily made so after priming.

Further advantages will be noted when the invention is better understood, its structural details being fully described in the specification following hereafter, and illustrated in the accompanying drawings in which—

Figure 1 is a vertical section of the pump. Fig. 2 is a plan view.

Referring more particularly to the drawing, 5 denotes a well or other suitable source of water supply, into which a suction pipe 6 extends, said pipe being provided with an ordinary foot valve 7. On the upper end of the suction pipe is screwed a head 8 which is hollow. The priming pipe 9 also screw into this head in such a position as to extend in axial alinement with the suction pipe 6.

By means of the head 8, the pipes 6 and 9 are coupled together, so that they will rotate together. On the pipe 9 is mounted a flanged pulley 10 which carries a drive belt by means of which the pump is operated from an engine or other suitable source of power.

At 11 is indicated a suitable framework provided with bearings in which the pipes 6 and 9 are supported. Each bearing comprises a conical bushing 12 mounted in an opening made in the frame, in the bore of which bushings are received rollers 13. The pipes are fitted with conical thrust collars 14 which engage the rollers.

The upper end of the priming pipe 9 is provided with a cap 15 or other suitable closure, and adjacent to the head 8, said pipe is provided with a gate, or other suitable form of valve 16.

At 17 are indicated the discharge pipes of the pump, they being fitted at their outer ends with flexible nozzles 18 which may be short sections of hose. The pipes screw into the head 8 and extend radially therefrom in a horizontal plane. On the pipes 17 are mounted brackets 19 to which are connected one of the ends of the springs 20, the other ends of the springs being connected to the nozzles adjacent to the outer or discharge ends thereof. The function of these springs is to hold the nozzles in upright position when the pump is not working, for a purpose to be presently described. The discharge ends of the nozzles in this position are in the same horizontal plane as the valve 16.

The operation of the pump is as follows: The closure 15 is removed, and water is poured into the priming pipe 9 whereupon it runs down the suction pipe 6 and closes foot valve 7. Sufficient water is poured into the priming pipe to completely fill the suction pipe, the head, discharge pipes 17, and the priming pipe up to the valve 16. Inasmuch as the discharge ends of the nozzles 18 lie in the same horizontal plane as the valve, said nozzles also fill. The valve 16 is then closed, thus leaving no air in the pipes below the valve. More water is now poured into the priming pipe 9 until it is filled, after which the closure 15 is applied, thus making the priming pipe absolutely air-tight. The pump is now rotated by the belt passing over the pulley 10. As soon as sufficient speed is attained, the centrifugal force generated causes the water to discharge from the nozzles 18. This same centrifugal force also tends to straighten out said nozzles until they extend in axial alinement with the discharge pipes 17, they thus assuming a position of least resistance to the flow of the water, and as they are free of valves, and devoid of curves, the resistance to the flow is reduced to the minimum. Upon stopping the pump, the flow from the nozzle ceases, and the springs 20 pull them back to their upright position, thus retaining the priming. The pump discharges into a circular trough 21 which is so positioned that the nozzles discharge thereinto when they are swung outwardly into the discharging position. This tank is entirely separate from the pump, and therefore does not interfere with the operation thereof.

What is claimed is:

1. A centrifugal pump comprising a suction pipe, radial discharge pipes connected thereto, means for rotating the discharge pipes, flexible discharge nozzles connected to the discharge pipes, means for bringing the nozzles into erect position when the pump is out of action, a priming pipe connected to the suction pipe, and extending above the plane of the outlet ends of the nozzles when in erect position, and a valve in the priming pipe in the same horizontal plane as said outlet ends.

2. A centrifugal pump comprising a suction pipe, radial discharge pipes connected thereto, means for rotating the discharge pipes, flexible discharge nozzles connected to the discharge pipes, a yielding connection between the discharge pipes and the outlet ends of the nozzles for holding said nozzles in erect position when the pump is out of action, a priming pipe connected to the suction pipe, and extending above the plane of the outlet ends of the nozzles when in erect position, and a valve in the priming pipe in the same horizontal plane as said outlet ends.

In testimony that I claim the foregoing as my own, I have hereto affixed my signature in the presence of two witnesses.

DELAVAN V. BURRELL.

Witnesses:
JAMES PIPER,
R. W. BONEY.